United States Patent
Erickson et al.

[11] Patent Number: 5,957,161
[45] Date of Patent: Sep. 28, 1999

[54] LONG STROKE BALANCED SOLENOID

[75] Inventors: Bradley C. Erickson, Clarkston; Jerry A. Sowik, Livonia; David C. Mills, Clinton Township, all of Mich.

[73] Assignee: Borg-Warner Automotive, Inc., Troy, Mich.

[21] Appl. No.: 09/186,750

[22] Filed: Nov. 5, 1998

[51] Int. Cl.⁶ .......................... F15B 13/044; F16K 31/06
[52] U.S. Cl. .................................. 137/625.65; 251/129.21
[58] Field of Search .................. 137/625.65; 251/129.21

[56] References Cited

U.S. PATENT DOCUMENTS

| | | |
|---|---|---|
| 3,082,359 | 3/1963 | Mangiafico et al. . |
| 3,368,657 | 2/1968 | Wrensch et al. . |
| 4,503,884 | 3/1985 | Spils . |
| 4,810,985 | 3/1989 | Mesenich . |
| 4,917,150 | 4/1990 | Koch et al. . |
| 4,946,132 | 8/1990 | Reiter . |
| 5,076,326 | 12/1991 | McCabe . |
| 5,127,624 | 7/1992 | Domke . |
| 5,207,410 | 5/1993 | Wakeman . |
| 5,232,196 | 8/1993 | Hutchings et al. . |
| 5,326,075 | 7/1994 | Goff . |
| 5,419,369 | 5/1995 | House et al. . |
| 5,513,832 | 5/1996 | Becker et al. . |

*Primary Examiner*—Gerald A. Michalsky
*Attorney, Agent, or Firm*—Harness, Dickey & Pierce; Greg Dziegielewski

[57] ABSTRACT

A solenoid operated control valve (10) including a housing (16) that defines an internal chamber (34) therein, where an electromagnetic coil (44) is coaxially mounted within the internal chamber (34). A tubular shaped movable armature (60) is positioned within the internal chamber (34). An armature spring (72) biases the armature (60) to a first position within the internal chamber (34) when the coil (44) is not energized, and the armature (60) moves to a second position against the bias of the spring (72) when the coil (44) is energized. The armature (60) contacts a first armature stop (76) when it is in the first position and contacts a second armature stop (92) when it is in the second position. Both the first and second armature stops (76, 92) include radially extended protrusions (100) in order to minimize hydraulic tension. A valve body (64) is disposed within a center bore (62) of the armature (60) and includes openings (122, 124) that align with a side aperture (106) in the armature (60) to control fluid pressure between a supply port (30), a control port (136), and an exhaust port (30).

15 Claims, 2 Drawing Sheets

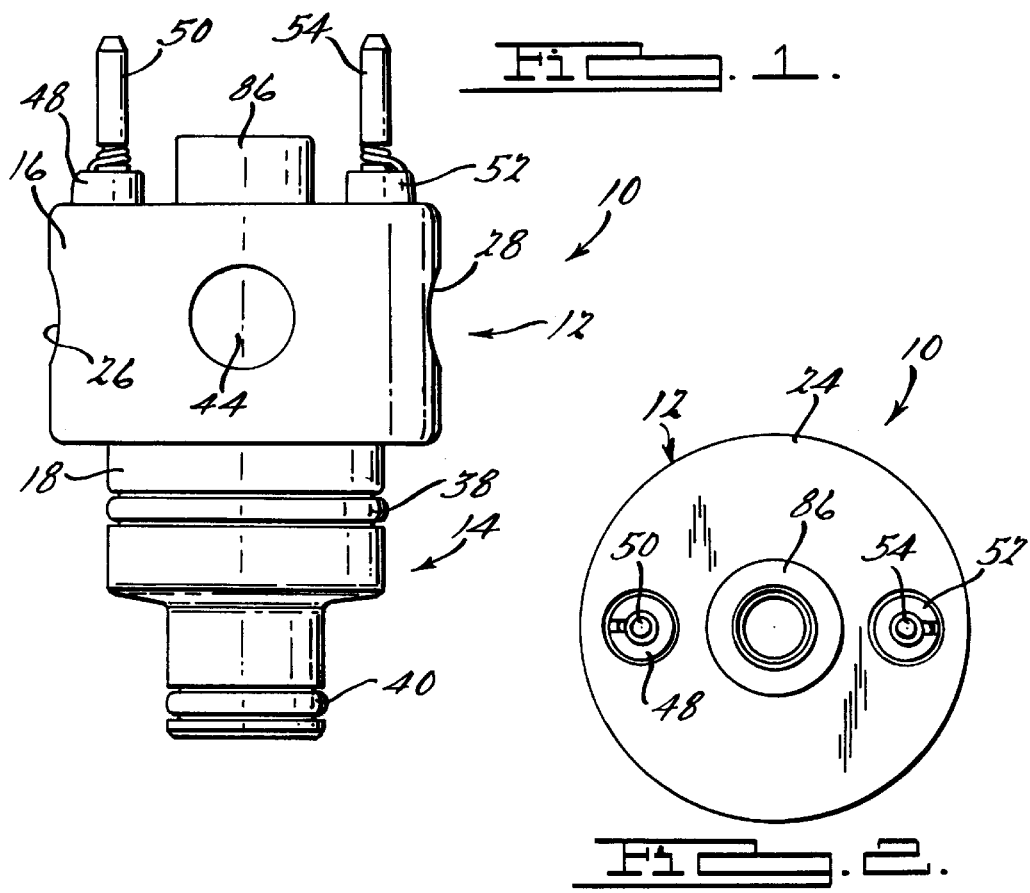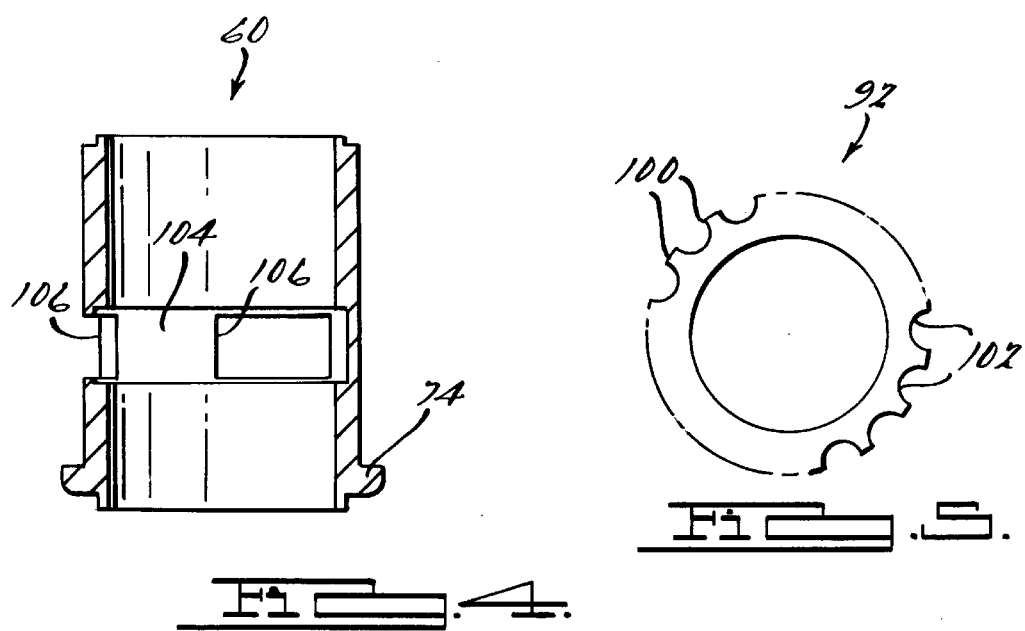

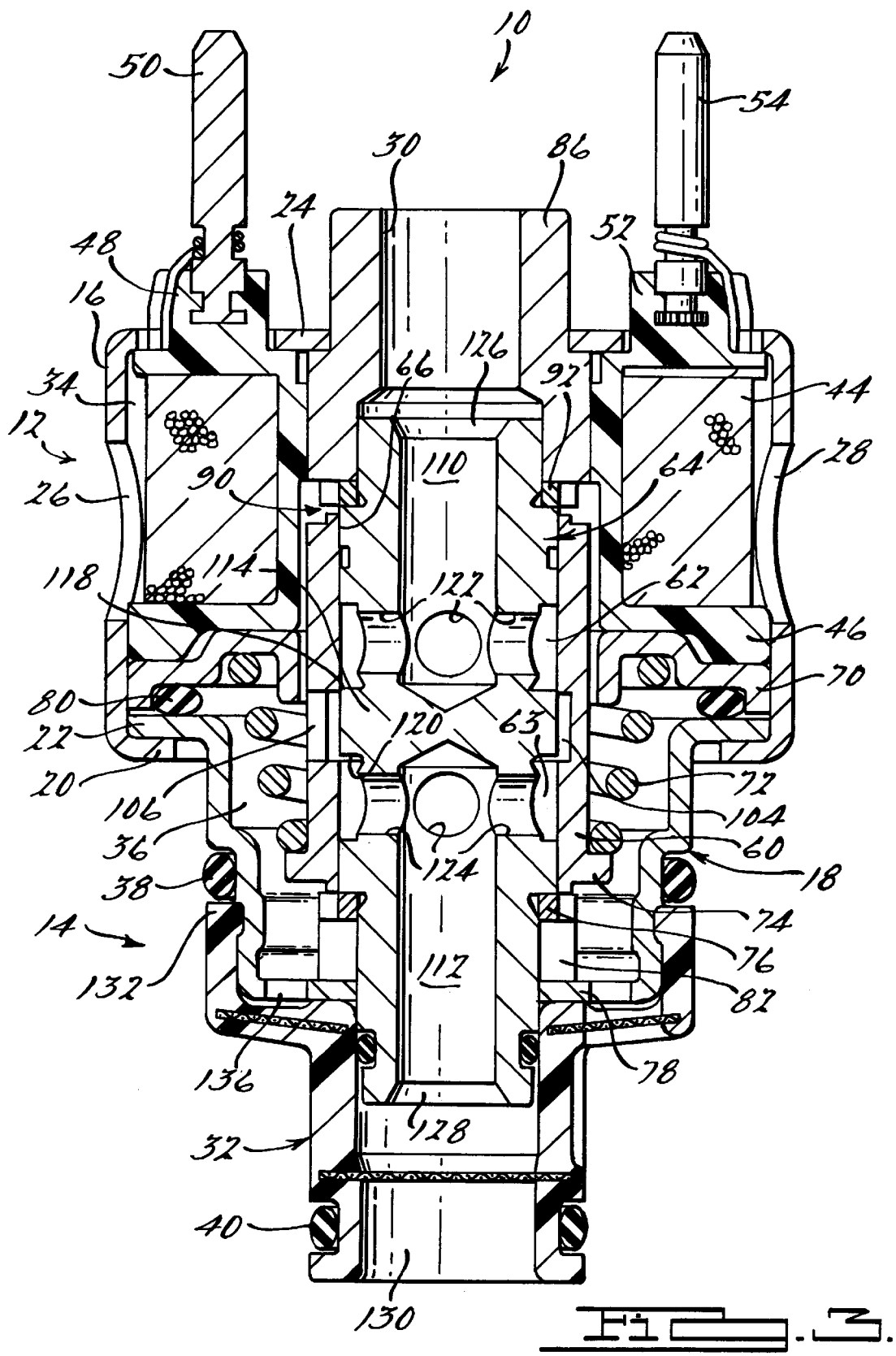

LONG STROKE BALANCED SOLENOID

BACKGROUND OF THE INVENTION

1. Field of the Invention

This invention relates generally to a fluid control valve and, more particularly, to a balanced pulse-width solenoid control valve that includes a star-shaped armature stop to minimize hydraulic tension between the armature stop and the armature.

2. Discussion of the Related Art

Modern vehicles generally employ an automatic transmission controller that includes several solenoid operated fluid control valves that independently act to control the pressure of the transmission fluid in the vehicle's transmission to operate various components of the transmission. For example, solenoid operated fluid control valves are known that use transmission fluid pressure to provide direct clutch control and line pressure control applications. The torque transmitted by a transmission clutch may be varied by varying the pressure of engagement between opposed clutch plates. Presently available transmission controllers can rapidly and precisely generate the desired electrical output to operate the control valves in response to sensed vehicle operating conditions to provide this pressure.

One particularly known solenoid valve used for this purpose is referred to as a balanced pulse-width modulated (PWM) solenoid valve, well known to those skilled in the art. The pulse-width modulated solenoid control valve is typically used to supply a hydraulic control pressure proportional to the duty cycle of a pulse-width modulated driver signal. The control pressure is provided that is a linear relationship to variations in "on-time" of the solenoid coil. The control valve that controls the fluid connection of the control port to a pressure supply must be capable of rapid shifting in close synchronization with the energization and deenergization of the coil. In order to effectively provide this transmission control, the pulse-width modulated solenoid control valve should prevent occurrence of oscillations due to the natural frequencies in the system, and smooth the pressure pulsations. The frequency of operation of the control valve is typically in the range of 30–100 Hz. Additionally, the valve seats must be capable of withstanding up to $1.5 \times 10^9$ switching operations at this frequency.

In certain solenoid control valve designs, an armature moves axially within the valve to open and close hydraulic ports within a valve body. When the armature moves from one position to another position, it will seat against an upper or lower armature stop. U.S. Pat. No. 5,076,326 issued to McCabe Dec. 31, 1991 discloses a control valve of this type. The armature should be movable in response to a relatively small magnetic force in order to minimize the size and power requirements of the control valve. When the armature is seated against an armature stop, hydraulic tension or vacuum locking between the armature stop and the armature sometimes adversely interferes with the ability of the armature to move from one position to another in close synchronization with coil energization and deenergization. The McCabe valve attempts to minimize this effect by forming depressions in the ends of the armature to minimize the surface contact between the armature and armature stop. U.S. Pat. No. 4,917,150 issued Apr. 17, 1990 to Koch et al. also includes this feature. However, this type of machining of the armature adds significant expense to the cost of the valve.

As the automatic controllers become more sophisticated, it is necessary that the solenoid operated control valves also include advancements and improvements over the state of the art. In this regard, it becomes important to increase the operating efficiency, reduce the cost, reduce the weight, reduce the complexity, etc. of the existing solenoid operated fluid control valves. Therefore, advancements in part reduction, component simplification, increasing valve stroke, etc. of the control valves is advantageous.

It is one object of the present invention to provide a solenoid control valve that further minimizes hydraulic tension between the armature and armature stop in a cost effective manner, and includes other advancements over those control valves known in the art.

SUMMARY OF THE INVENTION

In accordance with the teachings of the present invention, a solenoid operated control valve is disclosed that includes improvements over the known control valves in the art. The control valve includes a housing that defines an internal chamber therein, where an electromagnetic coil is coaxially mounted within the internal chamber. A tubular shaped movable armature is positioned within the internal chamber. An armature spring biases the armature to a first position within the internal chamber when the coil is not energized, and the armature moves to a second position against the bias of the spring when the coil is energized. The armature contacts a first armature stop when it is in the first position and contacts a second armature stop when it is in the second position. Both the first and second armature stops include radially extending protrusions that minimize hydraulic tension between the armature stop and the armature. A valve body is disposed within a center bore of the armature and includes openings that align with a side aperture in the armature to control fluid pressure between a supply port, a control port and an exhaust port.

Additional objects, advantages and features of the present invention will become apparent from the following description and appended claims, taken in conjunction with the accompanying drawings.

BRIEF DESCRIPTION OF THE DRAWINGS

FIG. 1 is an elevation view of a pulse width modulated solenoid control valve according to an embodiment of the present invention;

FIG. 2 is a top view of solenoid valve shown in FIG. 1;

FIG. 3 is a cross-sectional view of the solenoid valve shown in FIG. 1;

FIG. 4 is a cross-sectional view of an armature removed from the control valve shown in FIG. 3; and FIG. 5 is a plan view of a star-shaped armature stop removed from the control valve shown in FIG. 3, according to an embodiment of the present invention.

DETAILED DESCRIPTION OF THE PREFERRED EMBODIMENTS

The following discussion of the preferred embodiments directed to a balanced pulse-width modulated solenoid is merely exemplary in nature and is in no way intended to limit the invention or its applications or uses.

FIG. 1 is an elevation view, FIG. 2 is a top view, and FIG. 3 is a cross-sectional view of a pulse-width modulated solenoid control valve 10, according to an embodiment of the present invention. The solenoid control valve 10 can be used as a direct pressure control device in an automatic transmission (not shown) of a vehicle (not shown) to control the actuation of the vehicle clutch. Such an application is well known in the art, and therefore, the specific hydraulic connections, source pressures and control pressures used in association with the control valve 10 will not be shown or described below, as these things form no part of the present invention. The internal components of the control valve 10 make up the invention, and will be discussed in detail below. Also, as will be appreciated by those skilled in the art, the solenoid valve 10 of the invention is not limited for use in an automatic transmission of a vehicle, but has a much broader use in any control device that may use a solenoid valve of the type described herein.

The control valve 10 is separated into a magnetic portion 12 and a hydraulic portion 14. The magnetic portion 12 includes an outer housing or can 16 that encloses the magnetic components of the control valve 10. The can 16 is attached to a valve sleeve 18 by crimping a lower annular flange 20 of the can 16 to an upper annular rim 22 of the sleeve 18, as shown. An upper annular flange 24 of the can 16 is bent over to form a crimped connection at the top of the magnetic portion 12. The can 16 is made of a suitable magnetic material, and is formed to the shape shown by a suitable deep drawing, stamping and/or rolling process. The sleeve 18 is made of a suitable non-magnetic material, and is also formed to shape by a suitable deep drawing, stamping and/or rolling process. Circular side openings 26 and 28 are formed in the can 16 to reduce weight, and allow heat to escape from the magnetic portion 12. The can 16 defines a coil chamber 34 and the sleeve 18 defines a valve sleeve chamber 36 that combine to define a complete valve chamber.

An O-ring 38 is positioned around a middle portion of the sleeve 18 and an O-ring 40 is positioned around a lower portion of a filter unit 32 attached to the bottom of the sleeve 18. The control valve 10 extends far enough into a mounting casting to allow the O-rings 38 and 40 to provide a seal therein. In one embodiment, the casting includes other solenoid valves, hydraulic components, etc. used in the control of an automatic vehicle transmission, as would be well understood to those skilled in the art.

The magnetic portion 12 includes a coil 44 wound on a non-magnetic bobbin 46 and coaxially positioned within the coil chamber 34 as shown. The bobbin 46 is a plastic member that is molded to have the configuration as shown to conform to the components within the magnetic portion 12 for this particular application. The bobbin 46 includes a first connector portion 48 that accepts a first terminal contact 50 in a secured engagement, and a second connector portion 52 that accepts a second terminal contact 54 in a secure engagement. The first and second connector portions 48 and 52 and the first and second terminal contacts 50 and 54 extend out of the coil chamber 34 through the top of the can 16 as shown. The first and second contacts 50 and 54 are connected to an appropriate signal generating circuit (not shown) to energize the coil 44 within the can 16 when desirable.

A tubular armature 60 is coaxially positioned with the chambers 34 and 36 and defines cylindrical armature chambers 62 and 63 therein, as shown. A cross-sectional view of the armature 60 separated from the valve 10 is shown in FIG. 4. The armature 60 can be made of any suitable magnetic material for the purposes described herein. A valve body 64 is coaxially positioned within the armature chambers 62 and 63, and is rigidly secured to an inside surface of the sleeve 18. The armature 60 is movable in an axial direction within the chambers 34 and 36, and rides on an outer bearing surface 66 of the valve body 64. The bearing surface 66 includes a series of ridges and indentations to minimize the surface area that the armature 60 contacts the valve body 64. The orientation of the armature 60 and the valve body 64 controls the flow of transmission fluid through the valve 10, as will be described in more detail below. A series of armature openings 106 are formed in an annular recess 104 through a middle portion of the armature 60 so that the armature chambers 62 and 63 are in fluid communication with the sleeve chamber 36.

An annular flux washer 70, acting as a magnetic field line transfer, is positioned below the bobbin 46 adjacent to the rim 22 of the sleeve 18, and between the armature 60 and the can 16. The bias force of a valve spring 72 applies downward pressure on a spring ledge 74 to cause the armature 60 to seat against a lower annular armature stop 76. The lower armature stop 76 is mounted on a spacer 82 which in turn is mounted on a stop ledge 78 of the sleeve 18, and is positioned against the valve body 64. The flux washer 70 is stamped to have the shape shown to conform to the spring 72 and the bobbin 46. An O-ring 80 is positioned adjacent the flux washer 70, as shown, to provide sealing.

A cylindrical magnetic pole piece 86 extends towards the armature 60 from a top of the magnetic portion 12, and is positioned between the valve body 64 and the coil 44 adjacent to the bobbin 46, as shown. An upper armature stop 92 is mounted to an upper outside surface of the valve body 64. The pole piece 86 is pressed into the can 16, and is in contact with the upper armature stop 92. A working air gap 90 is defined between a lower edge of the armature stop 92 and an upper edge of the armature 60.

The control valve 10 is shown in a position when the coil 44 is not energized. In this position, the spring 72 applies pressure against the spring ledge 74 to force the armature 60 against the lower armature stop 76. Upon activation of the coil 44, magnetic field lines flow through the can 16, flow through the pole piece 86, flow through the armature stop 92, cross the gap 90 and enter the armature 60, flow through the armature 60 and enter the flux washer 70, and return to the can 16 to complete the magnetic path. The armature 60 is magnetically attracted towards the pole piece 86, and a top seat end of the armature 60 seats against the upper armature stop 92 against the bias of the spring 72. The amount of current supplied to the coil 44 and the distance between the armature 60 and the pole piece 86 determine how strongly the armature 60 will be attracted towards the pole piece 86. As is well understood in the art, the closer the armature 60 is to the pole piece 86, the magnetic attraction increases exponentially. One of ordinary skill in the art would know how to design the size of the gap 90 and current applied to the coil 44 for a particular application.

As mentioned above, hydraulic tension or vacuum sealing affects the operation of solenoid valves of this type. The present invention includes structural components to minimize hydraulic tension in the valve 10. FIG. 5 shows a top plan view of the upper armature stop 92, separated from the valve 10, with the understanding that the lower armature stop 76 is identical. As shown in this figure, the upper armature stop 92 includes a series of radially extended protrusions 100 defined by a series of semi-circular indentations 102 to form a "star" configuration. In this example, the armature stop 92 includes sixteen extended protrusions. However, as will be appreciated by those skilled in the art, this number of protrusions is specific for this embodiment, in that other numbers are equally applicable within the scope of the present invention. When the armature 60 seats against the upper armature stop 92, the surface area that the armature 60 contacts the stop 92 is minimized by the indentations 102. This same condition also occurs when the armature 60 seats against the lower armature stop 76. The limitation in surface area between the armature 60 and the upper and lower stops 76 and 92 reduces the hydraulic tension between these components, and thus reduces the impedance to the motion of the armature 60.

The valve body 64 has a general column shape defining a first bore 110 located in the upper portion of the valve body 64, and a second bore 112 located in the lower portion of the valve body 64 separated by a solid middle portion 114. The solid middle portion 114 is positioned adjacent to the recess 104 in the armature 60. A top annular metering edge 118 of the middle portion 114 closes an upper edge of the opening 106 when the armature 60 is positioned against the lower armature stop 76, and a lower annular metering edge 120 closes a lower edge of the opening 106 when the armature 60 contacts the upper armature stop 92. These large axial closures reduce leakages which contribute to greater system operating efficiency. A series of circular upper openings 122 are formed through the valve body 64 just above the middle portion 114 so that the first bore 110 is in fluid communication with the armature chamber 62. Likewise, a series of circular lower openings 124 are formed through the valve body 64 just below the middle portion 114 so that the second bore 112 is in fluid communication with the armature chamber 63. The first bore 110 includes an exhaust opening 126 at an upper location of the valve body 64 that is in fluid communication with an exhaust port 30 through the pole piece 86. The second bore 112 includes a supply opening 128 at a lower end of the valve body 64 that is in fluid communication with a supply port 130 at a lower location of the filter unit 32. The filter unit 32 is positioned on the sleeve 18 and provides a flow passage between the valve body supply opening 128 and the supply port 130, and is held in position by a ring 132 on the filter unit 32 fitting into a groove on the sleeve 18.

When the coil 44 is not energized, transmission fluid applied to the supply port 130 flows into the second bore 112 and flows out of the openings 124 into the chamber 63. Because the lower metering edge 120 of the middle portion 114 does not contact the armature 60 when it is in this position, the transmission fluid flows into the recess 104, out of the opening 102 and into the chamber 36, out of an annular control port 136, and through the filter unit 32. Therefore, the supply pressure $P_s$ is equal to the control pressure $P_c$ in that by changing the supply pressure $P_s$, the control pressure $P_c$ will change linearly. The supply port 130 and the control port 136 are sealed from the exhaust port 30 because the top metering edge 118 overlaps the armature 60 adjacent an upper edge of the recess 104. To remove the control pressure $P_c$, the coil 44 is energized so that the armature 60 moves upward against the upper armature stop 92 causing the lower metering edge 120 to close the chamber 63 to the recess 104. In this configuration, the control pressure $P_c$ in the chamber 36 exhausts into the recess 104, then into the chamber 62 above the middle portion 114, through the openings 122 into the first bore 110, and out of the exhaust opening 126 and the port 30. The control pressure $P_c$ then equals exhaust pressure $P_e$, which is low. By rapidly energizing and deenergizing the coil 44, the fluid communication between the control port 136 and the supply port 130 and the exhaust port 30 can be varied to control the control pressure $P_c$.

The valve 10 described above is generally intended to be used as an interface between electrical and hydraulic portions of a motor vehicle automatic transmission for regulating the engagement pressure applied to various clutches in the transmission. However, as will be appreciated by those skilled in the art, the valve can be used with any suitable hydraulic system that requires rapid and precise pressure control with high available flowrates.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A fluid control valve comprising:
   a housing defining an internal chamber therein, said internal chamber being in fluid communication with a supply port, a control port, and an exhaust port;
   an electromagnetic coil coaxially mounted within the housing relative to the internal chamber;
   a movable armature positioned within the internal chamber and having a first end, a second end, and a center channel;
   an armature spring, said armature spring biasing the armature to a first position within the internal chamber and said armature being movable from the first position to a second position against the bias of the spring upon energizing the coil;
   a valve body positioned in the armature center channel, said valve body including a first tubular portion in fluid communication with the exhaust port and a second tubular portion in fluid communication with the supply port; and
   at least one armature stop positioned to be in contact with the second end of the armature when the armature is in the first position, said at least one armature stop being a flat planar ring having a plurality of radially extended protrusions that are defined by recessed areas cut out of an edge of the ring so that the radial dimension of the ring is less at the recessed areas than at the protrusions, said armature stop reducing the amount of contact between the armature stop and the armature to reduce the hydraulic tension between the armature stop and the armature.

2. The control valve according to claim 1 wherein the recessed areas separating the extended protrusions of the armature stop are semi-circular in shape.

3. The control valve according to claim 1 wherein the at least one armature stop is a first armature stop and a second armature stop, both the first and second armature stops being ring-shaped armature stops including a plurality of radially extended protrusions, wherein the first armature stop is in contact with the first end of the armature when the armature is in the second position and the second armature stop is in contact with the second end of the armature when the armature is in the first position.

4. The control valve according to claim 1 wherein the first tubular portion of the valve body includes a first opening in fluid communication with the exhaust port and a second opening in fluid communication with a side aperture in the armature, and the second tubular portion includes a third opening in fluid communication with the supply port and a fourth opening in fluid communication with the side aperture, said second opening being in fluid communication with the side aperture and the control port when the armature is in the second position and the fourth opening being in fluid communication with the side aperture and the control port when the armature is in the first position.

5. The control valve according to claim 1 wherein the electromagnetic coil is wound on a bobbin, and wherein a pole piece is positioned within the bobbin adjacent the exhaust port and the first tubular portion of the valve body.

6. The control valve according to claim 5 wherein the at least one armature stop is positioned adjacent to the pole piece.

7. The control valve according to claim 1 wherein the armature has a generally tubular configuration and the valve body has a generally column configuration, said armature being coaxially mounted over said valve body and being movable thereon.

8. The control valve according to claim 1 wherein the control valve is an interface between electrical and hydraulic components of a motor vehicle automatic transmission.

9. A fluid control valve comprising:

a housing defining an internal chamber therein;

an electromagnetic coil coaxially mounted within the housing relative to the internal chamber;

a movable armature positioned within the internal chamber and having a first end and a second end;

a valve spring, said valve spring biasing the armature to a first position within the internal chamber and said armature being movable from the first position to a second position against the bias of the spring upon energizing the coil; and at least one armature stop positioned to be in contact with the armature, said at least one armature stop being a flat planar ring having a plurality of radially extended protrusions that are defined by recessed areas cut out of an edge of the ring so that the radial dimension of the ring is less at the recessed areas than at the protrusions, said armature stop reducing the amount of contact between the armature stop and the armature to reduce the hydraulic tension between the armature stop and the armature.

10. The control valve according to claim 9 wherein the at least one armature stop is a first armature stop and a second armature stop, both the first and second armature stops being ring-shaped armature stops including a plurality of radially extended protrusions, wherein the first armature stop is in contact with the first end of the armature when the armature is in the second position and the second armature stop is in contact with the second end of the armature when the armature is in the first position.

11. The control valve according to claim 9 wherein the recessed areas separating the extending protrusions of the armature stop are semi-circular in shape.

12. A fluid control valve for controlling hydraulic pressure in an automatic transmission for a vehicle, said valve comprising:

a housing defining an internal chamber therein, said internal chamber being in fluid communication with a supply port, a control port and an exhaust port;

an electromagnetic coil wound on a non-magnetic bobbin and coaxially mounted within the housing relative to the internal chamber;

a movable armature positioned within the internal chamber and having a first end, a second end, a center channel, and a side aperture extending through the armature and into the center channel;

an armature spring, said armature spring being positioned on a spring ledge attached to the armature and biasing the armature to a first position within the internal chamber, said armature being movable from the first position to a second position against the bias of the spring upon energizing the coil;

a valve body disposed in the armature center channel, said valve body including a first tubular portion, a second tubular portion, and a middle portion separating the first and second tubular portions, said first tubular portion including a first opening in fluid communication with the exhaust port and a second opening in fluid communication with the side aperture and the second tubular portion including a third opening in fluid communication with the supply port and a fourth opening in fluid communication with the side aperture, said second opening being in fluid communication with the side aperture and the control port when the armature is in the second position and the fourth opening being in fluid communication with the side aperture and the control port when the armature is in the first position; and a first armature stop and a second armature stop, both the first and second armature stops being flat planar ring-shaped armature stops including a plurality of radially extended protrusions defined by cut-out sections in an edge of the stops, wherein the first armature stop is in contact with the first end of the armature when the armature is in the second position and the second armature stop is in contact with the second end of the armature when the armature is in the first position.

13. The control valve according to claim 12 wherein the first and second armature stops each include sixteen radially extended protrusions.

14. The control valve according to claim 12 wherein the radially extended protrusions of the first and second armature stops are separated by semi-circular shaped recesses.

15. The control valve according to claim 12 wherein the first armature stop is positioned adjacent to a magnetic pole piece.

* * * * *